(12) United States Patent
Berteau et al.

(10) Patent No.: US 8,103,279 B2
(45) Date of Patent: Jan. 24, 2012

(54) RESTRICTIVE AND PREFERENTIAL ROUTING IN A DISTRIBUTED MOBILE SWITCHING CENTER ENVIRONMENT WITH MEDIA GATEWAY CLUSTERS

(75) Inventors: Charles Marvin Berteau, Plano, TX (US); Michael Aguilar, Richardson, TX (US); Seshagiri Rao Madhavapeddy, Richardson, TX (US)

(73) Assignees: Alcatel Lucent, Paris (FR); Alcatel-Lucent, Kuala Lumpur (MY)

( * ) Notice: Subject to any disclaimer, the term of this patent is extended or adjusted under 35 U.S.C. 154(b) by 264 days.

(21) Appl. No.: 10/599,893

(22) PCT Filed: Apr. 21, 2005

(86) PCT No.: PCT/US2005/013826
§ 371 (c)(1),
(2), (4) Date: Oct. 12, 2006

(87) PCT Pub. No.: WO2005/107288
PCT Pub. Date: Nov. 10, 2005

(65) Prior Publication Data
US 2007/0212530 A1 Sep. 13, 2007
US 2011/0104462 A2 May 5, 2011

Related U.S. Application Data

(60) Provisional application No. 60/564,003, filed on Apr. 21, 2004.

(51) Int. Cl.
H04W 74/00 (2009.01)
H04W 4/00 (2009.01)
H04M 7/00 (2006.01)
(52) U.S. Cl. .......... 455/445; 455/450; 370/340
(58) Field of Classification Search .......... 455/445, 455/450, 432; 370/340, 341; 379/220
See application file for complete search history.

(56) References Cited

U.S. PATENT DOCUMENTS

| | | | |
|---|---|---|---|
| 5,978,677 A * | 11/1999 | Sawyer | 455/432.1 |
| 5,978,678 A | 11/1999 | Houde et al. | |
| 5,982,869 A * | 11/1999 | Lozano et al. | 379/220.01 |
| 6,052,591 A | 4/2000 | Bhatia | |
| 7,283,518 B2 * | 10/2007 | Vikberg et al. | 370/352 |
| 2003/0104828 A1 | 6/2003 | Nguyen | |
| 2004/0185836 A1 * | 9/2004 | Pelaez et al. | 455/414.1 |
| 2004/0204095 A1 * | 10/2004 | Cyr et al. | 455/560 |
| 2005/0226400 A1 * | 10/2005 | Farber et al. | 379/114.01 |

FOREIGN PATENT DOCUMENTS
EP 1191800 A 3/2002
* cited by examiner

Primary Examiner — George Eng
Assistant Examiner — Nizar Sivji
(74) Attorney, Agent, or Firm — RG & Associates LLC

(57) ABSTRACT

A system and method for routing calls in a distributed mobile switching center environment involves receiving a call at a first node (115(1)) in a telecommunication network (100). The first node is associated with multiple trunks (430, 445). A constraint relating to selection of a circuit for routing the call is identified (320). The circuit is associated with one of the trunks that is associated with the first node. The call is routed (350) to a trunk in accordance with the constraint.

15 Claims, 6 Drawing Sheets

US 8,103,279 B2

RESTRICTIVE AND PREFERENTIAL ROUTING IN A DISTRIBUTED MOBILE SWITCHING CENTER ENVIRONMENT WITH MEDIA GATEWAY CLUSTERS

REFERENCE TO RELATED APPLICATIONS

This application is related to and claims the benefit of provisional application Ser. No. 60/564,003, filed Apr. 21, 2004, which is incorporated herein by reference.

TECHNICAL FIELD

This description relates to telecommunications, and more particularly to routing calls in a distributed mobile switching center environment that includes media gateway clusters.

BACKGROUND

Conventional cellular telecommunications networks include mobile switching centers (MSCs) each operating to route calls between base stations that include radio equipment for serving one or more cells in the cellular network and other MSCs or public switched telephone networks (PSTNs). Conventional MSCs handle both bearer traffic for transporting user information (e.g., voice or other data in an integrated services digital network (ISDN)) and signaling traffic for establishing and controlling call connections and managing the cellular network. The MSC exchanges signaling information with other MSCs and with other networks (e.g., PSTNs) for purposes of call set up, handovers, and coordinating call routing. In addition, the MSC directs the operations of base stations that support radio communications with mobile devices in individual cells of the cellular network.

SUMMARY

Distributed MSCs (e.g., as can be used with 3GPP, Release 4) perform the same general functions as a conventional MSC but include an MSC server for handling signaling traffic and multiple media gateways for handling bearer traffic. The MSC server includes the intelligence and complexity of the distributed MSC, and the media gateways are controlled by the MSC server. The media gateways can be geographically distributed, can each control multiple base stations, and serve to route bearer traffic under control of the MSC server.

In one general aspect, calls are routed in a distributed mobile switching center environment by receiving a call at a first node in a telecommunication network. The first node is associated with multiple trunks. A constraint relating to selection of a circuit for routing the call is identified. The circuit is associated with one of the trunks that is associated with the first node. The call is routed to a trunk in accordance with the constraint.

Implementations can include one or more of the following features. The first node is one of multiple nodes operable to handle bearer traffic, and each of the nodes operates under control of a server using signaling traffic associated with the bearer traffic. The constraint relates to a preference or a restriction against routing the call through an interconnection with another one of the nodes. The constraint is defined in a set of routing rules based on data relating to the call. The server controls routing of the call to a trunk. The preference relates to selecting a circuit associated with the first node for routing the call if a circuit associated with the first node is available and allowing use of a circuit associated with a particular other one of the nodes through an interconnection if a circuit associated with the first node is not available. The restriction involves precluding selection of a circuit associated with one of the nodes other than the first node. Each trunk is associated with multiple circuits, and each node is associated with one or more circuits for each trunk. Two or more of the nodes serve an overlapping geographical area and/or two or more of the nodes serve different geographical areas.

In another general aspect, a telecommunications system includes a distributed mobile switching center that includes multiple media gateways and a server. Each media gateway is associated with multiple trunks and the server is operable to control routing for the media gateways based on a constraint associated with each media gateway. The constraint relates to selecting a circuit associated with a terminating trunk for a call based, at least in part, on the media gateway receiving the call.

Implementations can include one or more of the following features. The media gateways include a cluster of media gateways having interconnections between media gateways in the cluster, and the constraint provides a preference or a restriction against routing the call through the interconnection. Each of the trunks is associated with multiple circuits and each media gateway in the cluster is associated with one or more of the circuits for each of the trunks. The call is associated with a particular circuit associated with an originating trunk and the media gateway receiving the call is associated with the particular circuit. The restriction involves precluding selection of a circuit associated with one of the media gateways other than the media gateway receiving the call, and the preference involves selecting a circuit associated with a media gateway receiving the call if a circuit associated with the media gateway receiving the call is available and allowing use of a circuit associated with another one of the media gateways through an interconnection if a circuit associated with the media gateway receiving the call is not available. The server handles signaling traffic for the distributed mobile switching center and the media gateways handle bearer traffic for the distributed mobile switching center.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
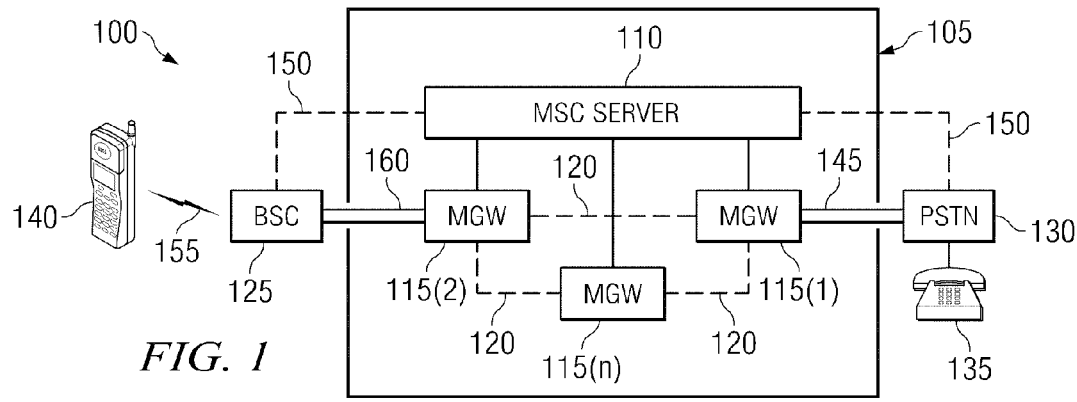
FIG. 1 is a block diagram of a telecommunications network that includes a distributed mobile switching center (MSC).

FIG. 1 is a block diagram of a telecommunications network 100 that includes a distributed mobile switching center (MSC) 105, or wireless soft switch. The distributed MSC 105 includes an MSC server 110 that controls multiple media gateways (MGWs) 115(1) . . . 115(n), or wireless media gateways, which are connected by interconnections 120 through which bearer traffic can be routed between different media gateways 115. The media gateways 115 can be geographically distributed such that each media gateway 115 is associated with a number of base stations and/or base station controllers 125 that serve different geographical areas. One or more of the media gateways 115 interface with a PSTN 130.

When a call is placed from a telephone 135 in a fixed network to a mobile station 140 in a cellular network, the PSTN 130 routes the call through an originating trunk 145 to a media gateway 115(1) in the cellular network and sends signaling data to the MSC server 110 in, for example, an ISDN user part (ISUP) message 150. The MSC server 110 sends signaling data to a base station controller 125 serving an area in which the mobile station 140 is located for establishing a radio connection 155 with the mobile station 140. In addition, the MSC server 110 directs the media gateway 115(1) connected to the originating trunk 145 to route the call through an interconnection 120 to another media gateway 115(2) that is capable of connecting with the base station controller 125, if necessary (i.e., if the originating media gateway 115(1) is not connected to the base station controller 125). The MSC server 110 also directs the other media gateway 115(2) to route the call through a terminating trunk 160 to the base station controller 125 to establish a call connection between the telephone 135 and the mobile station 140.

Figure 2:
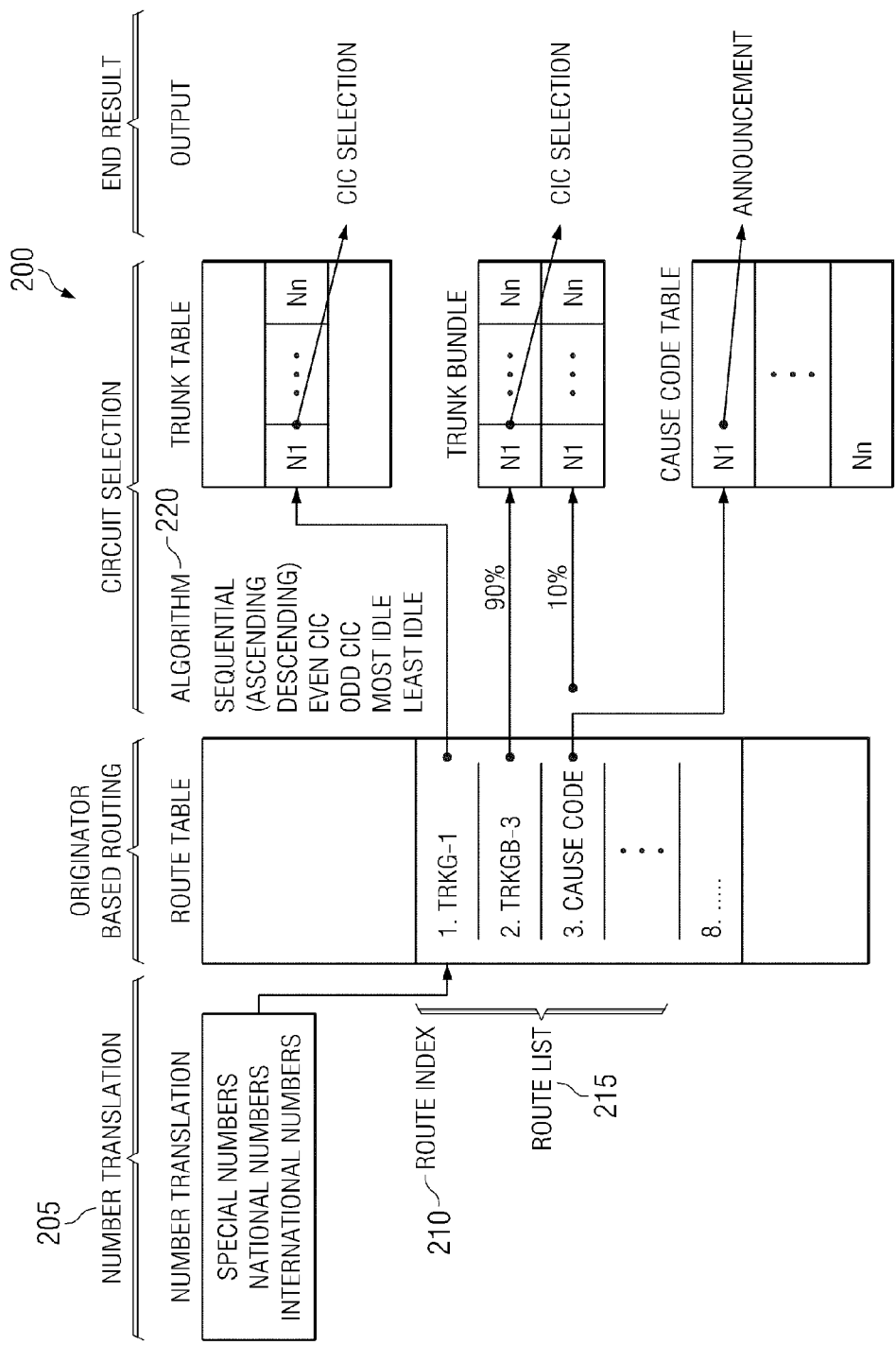
FIG. 2 is a schematic diagram of a routing methodology for selecting call routes.

FIG. 2 is a schematic diagram of a routing methodology 200 for selecting call routes. When a call is received, the called number is input to a number translation 205, in which the called number is translated. Using the translation, a route index 210 is identified based, for example, on the called number, a time, an originating party, an originating trunk, and/or a circuit from which the call is received. The route index 210 points to a route list 215 that includes a sequence of routing rules for routing the call. The route list 215 can include a number of entries, such as trunk group, trunk group bundle, cause code, and the like. Each entry can include data fields such as type, parameter, and out pulse index. Based on the route list 215, a circuit selection algorithm 220 is used to assign a terminating circuit for the call, which results in, for example, selection of a particular switching circuit or some other function (e.g., an announcement if a circuit is unavailable).

As a network grows or in large population centers, the media gateways 115 can be grouped in clusters to provide redundancy or better handle loads in a particular geographical area. As depicted in FIG. 1, the media gateways 115 within a cluster can interface with one another through interconnections 120. As a result, in a typical implementation in which media gateways 115 are clustered in one location, all of the media gateways 115 within the cluster are treated as a single switch and use a single set of routing translations. Accordingly, a call that arrives at a cluster of media gateways 115 through an originating trunk connected to a first media gateway 115(1) may be assigned to a terminating trunk connected to a second media gateway 115(2). As a result, the call is routed from the first media gateway 115(1) to the second media gateway 115(2) through an interconnection 120.

Among other things, the present invention recognizes a potential unavailability of or a relative cost associated with the use of such interconnections 120. In accordance with one aspect of the present invention, routing decisions for each media gateway 115 are treated separately, including in cases where multiple media gateways 115 are located in a single geographical location. Accordingly, routing can be restricted from or subject to preferences against using an interconnection 120 between different media gateways 115. This technique can prevent the need for interconnections 120 that are sufficient to handle a random call distribution, which may be prohibitively expensive in a multiple (e.g., four or more) media gateway cluster.

Figure 3:
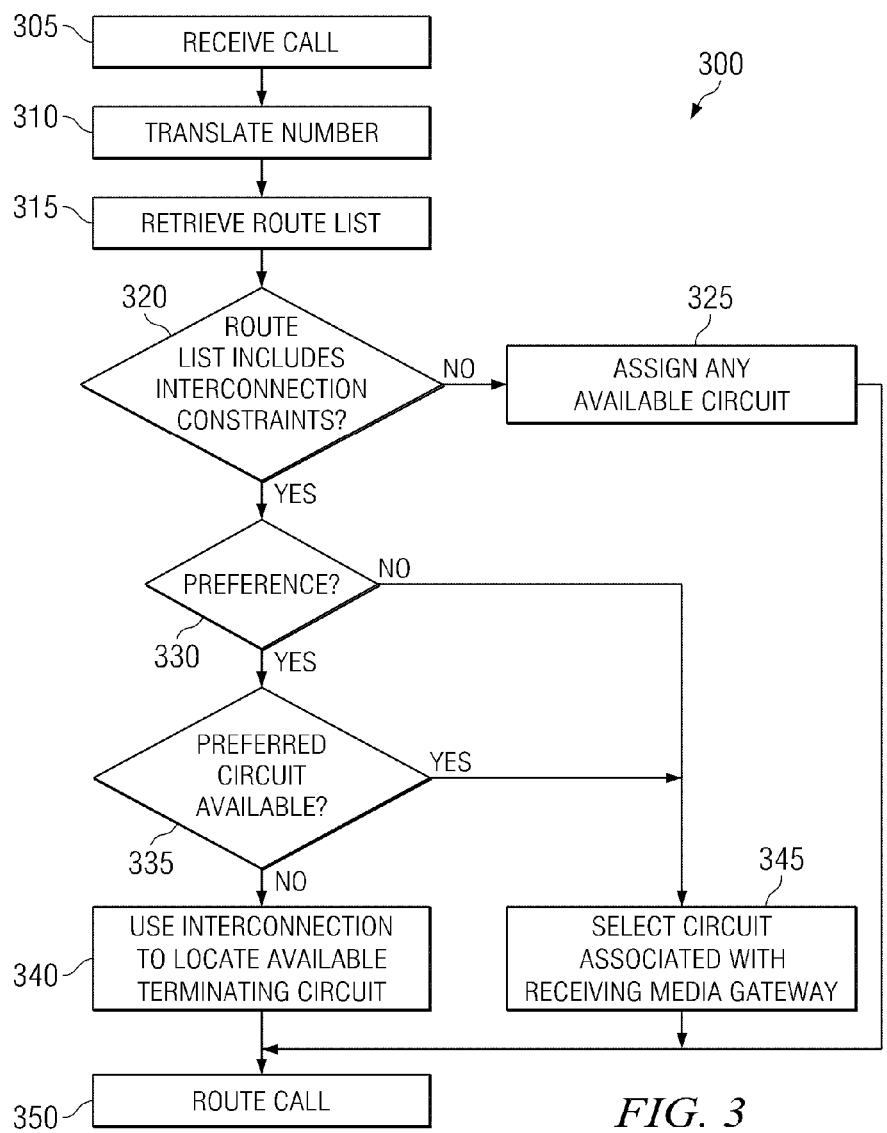
FIG. 3 is a flow diagram of a process for handling calls in a distributed MSC environment.

FIG. 3 is a flow diagram of a process 300 for handling calls in a distributed MSC environment. A call is received (305), and a called number included in the received call is translated (310) in accordance with a number translation table. Based on the number translation, a route list is retrieved (315). The route list includes rules and/or other data defining how the call is to be routed. Generally, each entry in the route list is evaluated sequentially until an available and/or potential route is identified. A determination is made as to whether the route list or the identified entry includes interconnection constraints (320). The interconnection constraints can include restrictions and/or preferences against using an interconnection between media gateways to route the call. The interconnection constraints can be implemented in the route list based on an ordering of trunk groups (e.g., in cases where the network does not include an interconnection between media gateways 115) and/or adding a "label" data field in a data structure for a trunk group or trunk bundle in the route list (e.g., in cases where a route list entry can lead to multiple paths depending on whether an interconnection is used). The label data field can include values indicating restrictive, preferential, or no routing constraints. The label data field does not affect a sequential progression through the route list but influences the selection of a circuit within a trunk group or trunk bundle in the route list. If the route list does not contain any interconnection constraints, any available circuit is assigned (325).

If the route list does contain an interconnection constraint, a determination is made (330) as to whether the interconnection constraint represents a preference against using an interconnection between media gateways 115, for using a particular terminating circuit or trunk, and/or against using a terminating circuit or trunk connected to a media gateway 115(1) at which the call is received. If the interconnection constraint does represent a preference, a determination is made as to whether a preferred terminating circuit is available for the call connection (335). The preferred circuits are identified as circuits connected to the originating media gateway 115(1) so as to avoid use of an interconnection 120. In some cases, all of the preferred circuits and/or all of the interconnections 120 are unavailable, in which case an available terminating circuit corresponding to a media gateway 115 (e.g., media gateway 115(2)) other than the media gateway 115(1) connected to an originating circuit (e.g., a circuit through which the incoming call is received at the media gateway 115(1)) is selected (340). As a result, the call is routed through an interconnection 120.

If a preferred circuit is available or if the interconnection constraint does not represent a preference (i.e., instead, it represents a restriction), a circuit connected to the originating media gateway 115(1) is selected (345). Regardless of the circuit selected (at 325, 335, or 340), the call is routed using the selected circuit (350). Although not depicted in the flow diagram, in some cases, a terminating circuit meeting any applicable selection constraints (at 325, 335, or 340) may be unavailable (e.g., all circuits are busy). In such a situation, the call cannot be completed, and an appropriate announcement can be delivered to the calling party.

Figure 4:
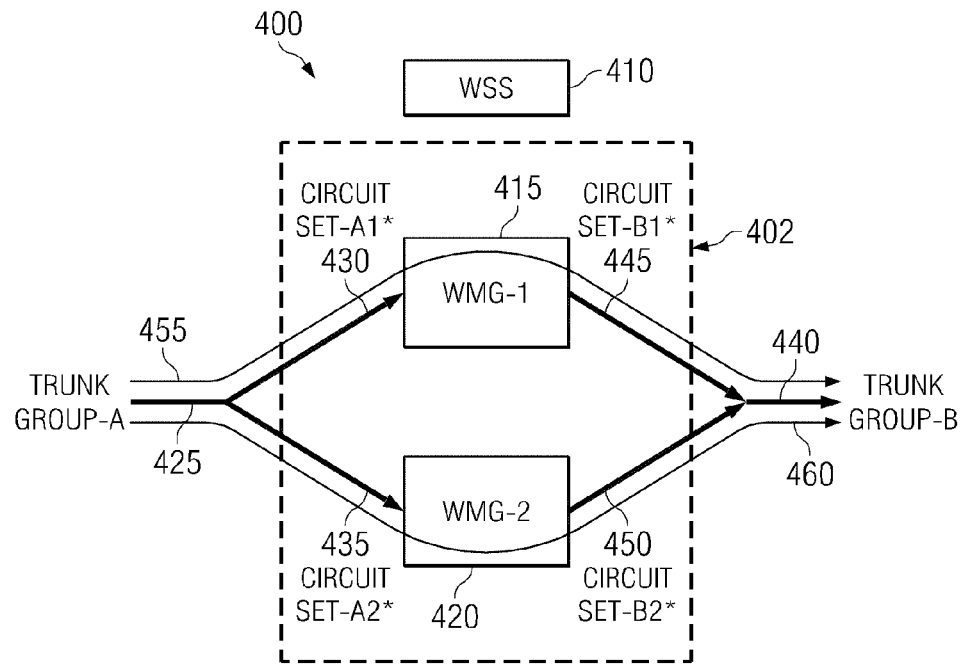
FIG. 4 is a schematic diagram of a scenario in which a distributed MSC includes multiple media gateways that are in the same geographical location but that do not include an interconnection.

FIG. 4 is a schematic diagram of a scenario in which a distributed MSC 400 includes multiple media gateways that are in the same geographical location (a site 402) but that do not include an interconnection. The distributed MSC 400 includes an MSC server 410 (i.e., a wireless soft switch (WSS)) and media gateways 415 and 420 (i.e., wireless media gateways (WMGs)). An originating trunk group A 425 includes a first set of circuits A1 430 connected to a first media gateway 415 and a second set of circuits A2 435 connected to a second media gateway 420. A terminating trunk group B 440 includes a first set of circuits B1 445 connected to the first media gateway 415 and a second set of circuits B2 450 connected to the second media gateway 420. In this scenario, the MSC server 410 implements a restrictive interconnection constraint, which prevents, for example, an assignment of a terminating circuit from the second set of circuits B2 450 to a call that arrives at the first media gateway 415 using an originating circuit from the first set of circuits A1 430.

The restrictive constraint applies a rule set that precludes use of an interconnection. Accordingly, if a call lands on the first media gateway 415, a terminating circuit in the first set of circuits B1 445 is selected. The call is therefore routed through an originating circuit in the first set of circuits A1 430, the first media gateway 415, and a terminating circuit in the first set of circuits B1 445 (as indicated at 455). If a call lands on the second media gateway 420, a terminating circuit in the second set of circuits B2 450 is selected. The call is therefore routed through an originating circuit in the second set of circuits A2 435, the second media gateway 420, and a terminating circuit in the second set of circuits B2 450 (as indicated at 460). Although the restrictive interconnection constraint is illustrated in this case using media gateways 415 and 420 that do not include an interconnection, the restrictive interconnection constraint can also be used in cases where there is an interconnection between the media gateways 415 and 420. In addition, although the trunk groups 425 and 440 are referred to as originating and terminating for ease of illustration, trunk groups are typically bi-directional in that calls can originate from and terminate on any trunk group. Accordingly, the restrictive interconnection constraint is associated with both trunk group A 425 and trunk group B 440. Similarly, circuits are also typically bi-directional.

Figure 5:
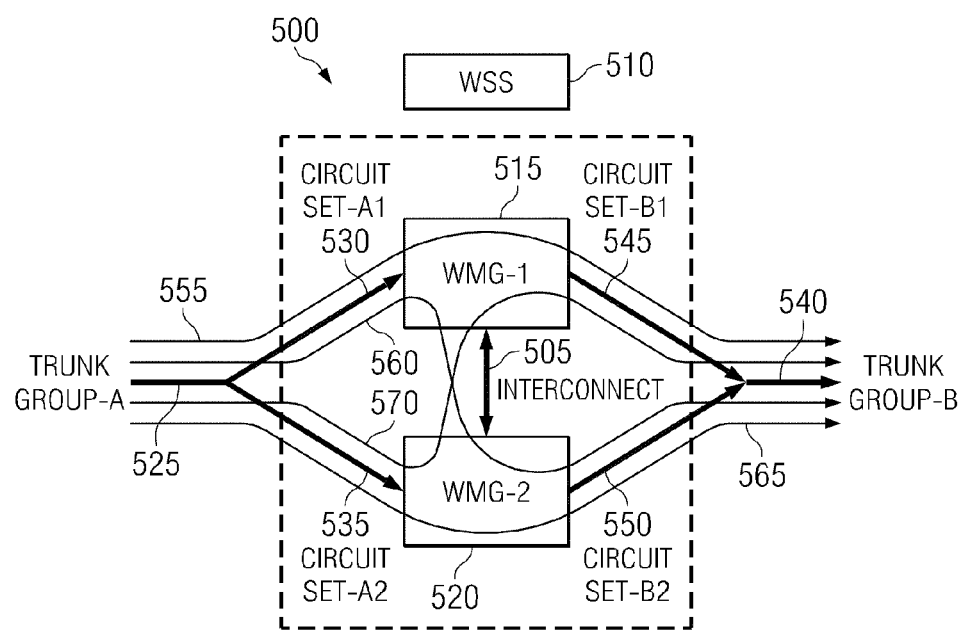
FIG. 5 is a schematic diagram of a scenario in which a distributed MSC includes multiple media gateways that are in the same geographical location and that include an interconnection.

FIG. 5 is a schematic diagram of a scenario in which a distributed MSC 500 includes multiple media gateways that are in the same geographical location and that include an interconnection 505. The distributed MSC 500 includes an MSC server 510 and media gateways 515 and 520. An originating trunk group A 525 includes a first set of circuits A1 530 connected to a first media gateway 515 and a second set of circuits A2 535 connected to a second media gateway 520. A terminating trunk group B 540 includes a first set of circuits B1 545 connected to the first media gateway 515 and a second set of circuits B2 550 connected to the second media gateway 520. In this scenario, the MSC server 510 implements a preferential interconnection constraint, which, for example, attempts to avoid, but selectively allows, an assignment of a terminating circuit from the second set of circuits B2 550 to a call that arrives at the first media gateway 515 using an originating circuit from the first set of circuits A1 530.

The preferential constraint applies a rule set for selection of a terminating circuit in trunk group B 540 that attempts to avoid use of the interconnection 505 but that allows such use in certain cases. Accordingly, if a call lands on the first media gateway 515, a terminating circuit in the first set of circuits B1 545 is selected, and the call is routed through an originating circuit in the first set of circuits A1 530, the first media gateway 515, and a terminating circuit in the first set of circuits B1 545 (as indicated at 555). If all circuits in the first set of circuits B1 545 are unavailable, a terminating circuit in the second set of circuits B2 550 is selected, and the call is routed through an originating circuit in the first set of circuits A1 530, the first media gateway 515, the interconnection 505, and a terminating circuit in the second set of circuits B2 550 (as indicated at 560).

If a call lands on the second media gateway 520, a terminating circuit in the second set of circuits B2 550 is selected, and the call is routed through an originating circuit in the second set of circuits A2 535, the second media gateway 520, and a terminating circuit in the second set of circuits B2 550 (as indicated at 565). If all circuits in the second set of circuits B2 550 are unavailable, a terminating circuit in the first set of circuits B1 550 is selected, and the call is routed through an originating circuit in the second set of circuits A2 525, the second media gateway 520, the interconnection 505, and a terminating circuit in the first set of circuits B1 545 (as indicated at 570). Corresponding preferential interconnection constraints to those associated with trunk group B 540 are associated with trunk group A 525.

Figure 6:
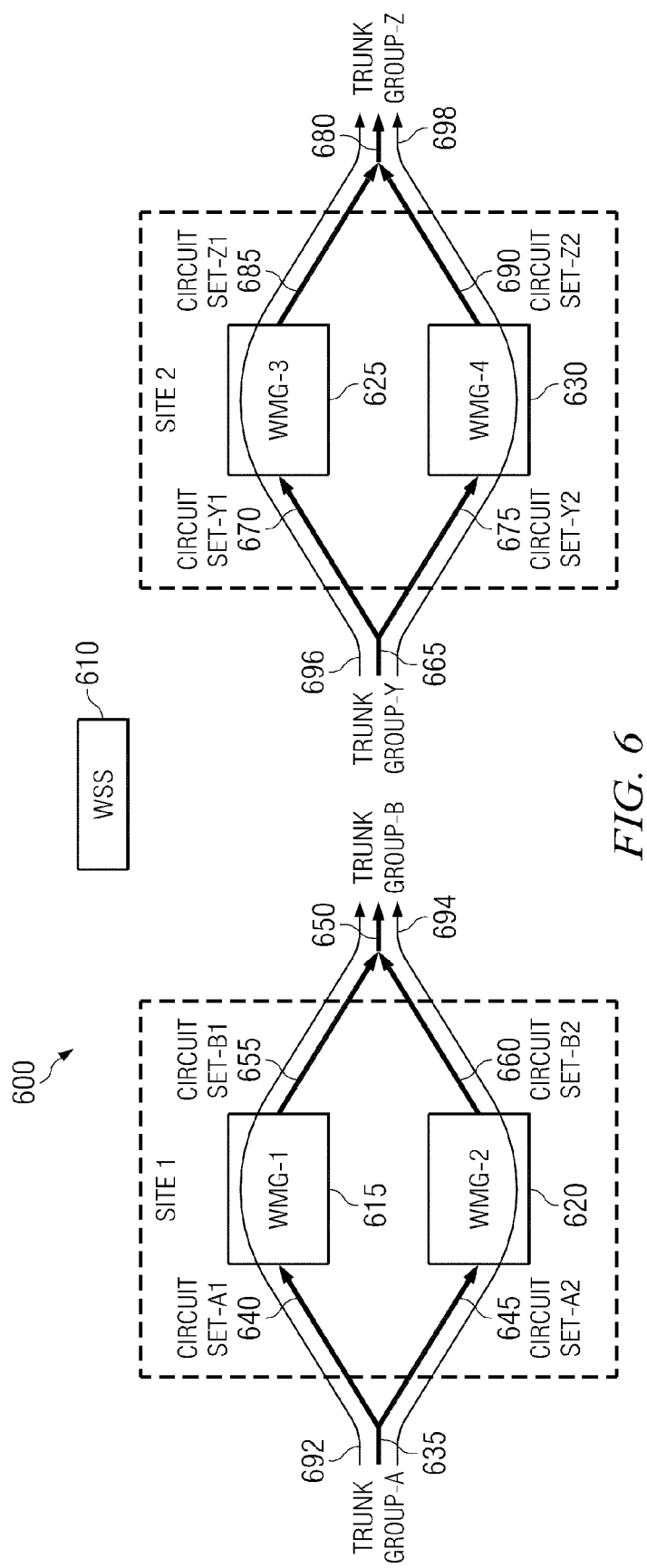
FIG. 6 is a schematic diagram of a scenario in which a distributed MSC includes multiple media gateway clusters that are in different geographical locations and that do not include an interconnection between media gateways within a site or between sites.

FIG. 6 is a schematic diagram of a scenario in which a distributed MSC 600 includes multiple media gateway clusters that are in different geographical locations and that do not include an interconnection between media gateways within a site or between sites. The distributed MSC 600 includes an MSC server 610 and media gateways 615, 620, 625, and 630. An originating trunk group A 635 includes a first set of circuits A1 640 connected to a first media gateway 615 and a second set of circuits A2 645 connected to a second media gateway 620. A terminating trunk group B 650 includes a first set of circuits B1 655 connected to the first media gateway 615 and a second set of circuits B2 660 connected to the second media gateway 620. An originating trunk group Y 665 includes a first set of circuits Y1 670 connected to a third media gateway 625 and a second set of circuits Y2 675 connected to a fourth media gateway 630. A terminating trunk group Z 680 includes a first set of circuits Z1 685 connected to the third media gateway 625 and a second set of circuits Z2 690 connected to the fourth media gateway 630.

In this scenario, the MSC server 610 implements a restrictive interconnection constraint, which prevents, for example, an assignment of a terminating circuit from the second set of circuits B2 650, the second set of circuits Y2 675, or the second set of circuits Z2 690 to a call that arrives at the first media gateway 615 using an originating circuit from the first set of circuits A1 640. The restrictive constraint applies a rule set for selection of a terminating circuit in trunk group B 650 or for selection of a terminating circuit in trunk group Z 680 that precludes use of an interconnection. Accordingly, if a call lands on the first media gateway 615, a terminating circuit in the first set of circuits B1 655 is selected, and the call is routed through an originating circuit in the first set of circuits A1 630, the first media gateway 615, and a terminating circuit in the first set of circuits B1 655 (as indicated at 692). If a call lands on the second media gateway 620, a terminating circuit in the second set of circuits B2 660 is selected, and the call is routed through an originating circuit in the second set of circuits A2 645, the second media gateway 620, and a terminating circuit in the second set of circuits B2 660 (as indicated at 694).

If a call lands on the third media gateway 625, a terminating circuit in the first set of circuits Z1 685 is selected, and the call is routed through an originating circuit in the third set of circuits Y1 670, the third media gateway 625, and a terminating circuit in the first set of circuits Z1 685 (as indicated at 696). If a call lands on the fourth media gateway 630, a terminating circuit in the second set of circuits Z2 690 is selected, and the call is routed through an originating circuit in the second set of circuits Y2 675, the fourth media gateway 630, and a terminating circuit in the second set of circuits Z2 690 (as indicated at 698). Corresponding preferential interconnection constraints to those associated with trunk group B 650 and trunk group Z 680 are associated with trunk group A 635 and trunk group Y 665.

Figure 7:
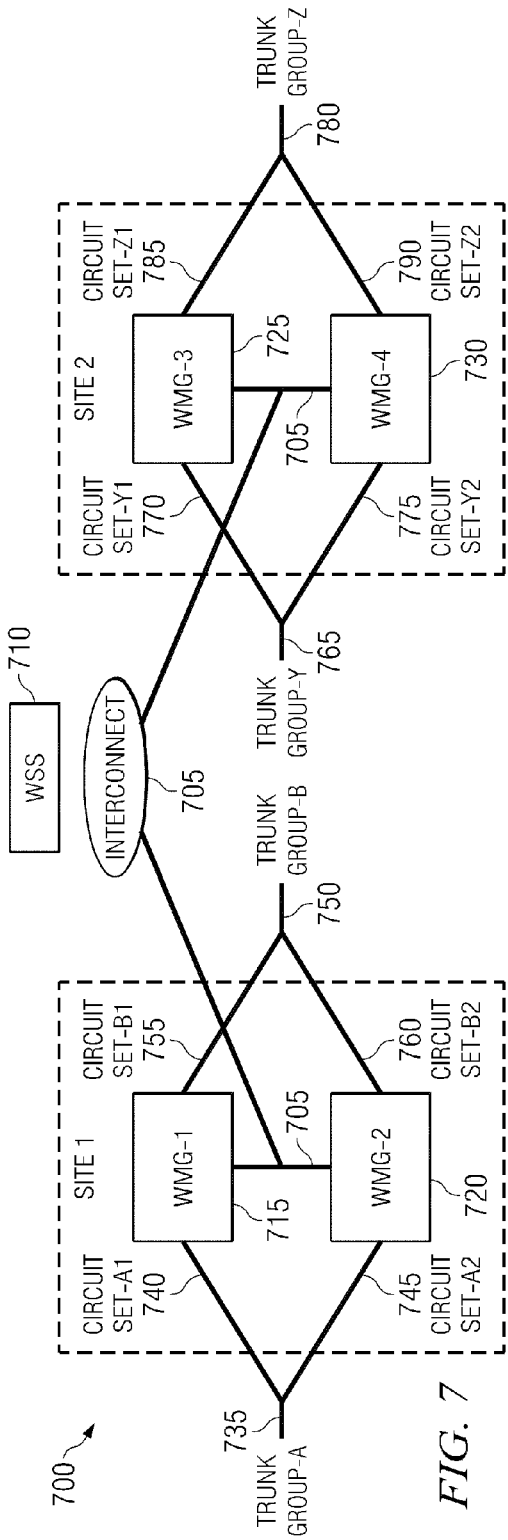
FIG. 7 is a schematic diagram of a scenario in which a distributed MSC includes multiple media gateway clusters that are in different geographical locations and that include interconnections between media gateways within a site and at different sites.

FIG. 7 is a schematic diagram of a scenario in which a distributed MSC 700 includes multiple media gateway clusters that are in different geographical locations and that include interconnections 705 between media gateways within a site and at different sites. The distributed MSC 700 includes an MSC server 710 and media gateways 715, 720, 725, and 730. An originating trunk group A 735 includes a first set of circuits A1 740 connected to a first media gateway 715 and a second set of circuits A2 745 connected to a second media gateway 720. A terminating trunk group B 750 includes a first set of circuits B1 755 connected to the first media gateway 715 and a second set of circuits B2 760 connected to the second media gateway 720. An originating trunk group Y 765 includes a first set of circuits Y1 770 connected to a third media gateway 725 and a second set of circuits Y2 775 connected to a fourth media gateway 730. A terminating trunk group Z 780 includes a first set of circuits Z1 785 connected to the third media gateway 725 and a second set of circuits Z2 790 connected to the fourth media gateway 730. The interconnections 705 connect each of the media gateways 715, 720, 725, and 730 to one another.

In this scenario, the MSC server 710 implements a preferential interconnection constraint for calls in which the destination trunk group is trunk group B 750 and no interconnection constraints for calls in which the destination trunk group is trunk group Y 765 or trunk group Z 780. The preferential interconnection constraint, for example, attempts to avoid, but selectively allows, an assignment of a terminating circuit from the second set of circuits B2 760 to a call that arrives at the first media gateway 715 using an originating circuit from the first set of circuits A1 740. The preferential constraint applies a rule set for selection of a terminating circuit in trunk group B 750 that attempts to avoid use of the interconnections 705 but that allows such use in certain cases.

Accordingly, if a call lands on the first media gateway 715, a terminating circuit in the first set of circuits B1 755 is selected, and the call is routed through an originating circuit in the first set of circuits A1 740, the first media gateway 715, and a terminating circuit in the first set of circuits B1 755. If all circuits in the first set of circuits B1 755 are unavailable, a terminating circuit in the second set of circuits B2 760 is selected, and the call is routed through an originating circuit in the first set of circuits A1 740, the first media gateway 715, one of the interconnections 705, and a terminating circuit in the second set of circuits B2 760.

If a call lands on the second media gateway 720, a terminating circuit in the second set of circuits B2 760 is selected, and the call is routed through an originating circuit in the second set of circuits A2 745, the second media gateway 720, and a terminating circuit in the second set of circuits B2 760. If all circuits in the second set of circuits B2 760 are unavailable, a terminating circuit in the first set of circuits B1 755 is selected, and the call is routed through an originating circuit in the second set of circuits A2 745, the second media gateway 720, one of the interconnections 705, and a terminating circuit in the first set of circuits B1 755. Corresponding preferential interconnection constraints to those associated with trunk group B 750 are associated with trunk group A 735 (e.g., for calls destined for trunk group A 735 that arrive on trunk group B 750).

The absence of interconnection constraints for calls in which the destination trunk group is trunk group Y 765 or trunk group Z 780 results in calls being routed through the available interconnections 705 without limitation. Route lists and/or rule sets that include restrictive, preferential, or no interconnection constraints can also be constructed for trunk group Y 765 and trunk group Z 780 in a similar manner.

Figure 8:
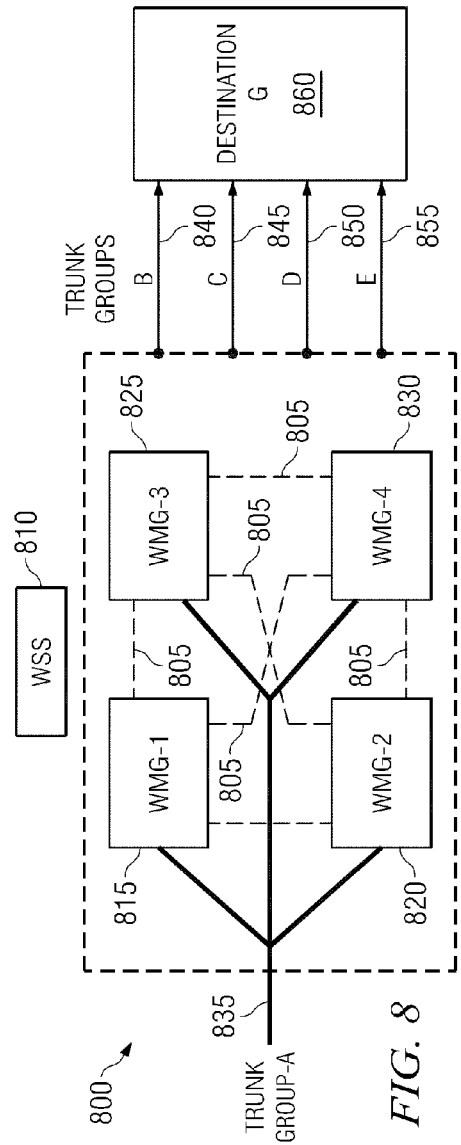
FIG. 8 is a schematic diagram of a scenario in which a distributed MSC includes a cluster of media gateways that are in a particular geographical location and that include interconnections between media gateways in the cluster.

FIG. 8 is a schematic diagram of a scenario in which a distributed MSC 800 includes a cluster of media gateways that are in a particular geographical location and that include interconnections 805 between media gateways in the cluster. The distributed MSC 800 includes an MSC server 810 and media gateways 815, 820, 825, and 830. An originating trunk group A 835 includes circuits that are distributed (equally or otherwise) among the media gateways 815, 820, 825, and 830. Each of the media gateways 815, 820, 825, and 830 are connected to four different outgoing trunk groups 840, 845, 850 and 855, each of which can be used to reach a particular destination G 860. Different interconnection constraints can be applied for each outgoing trunk group 840, 845, 850, or 855.

In this scenario, the MSC server 810 implements interconnection constraints for calls originating on trunk group A 835, including preferential interconnection constraints for trunk group B 840 and trunk group E 855, a restrictive interconnection constraint for trunk group C 845, and no interconnection constraint for trunk group D 850. Similar (or different) interconnection constraints can be implemented for calls originating on each of the other trunk groups 840, 845, 850, and 855.

If the call is destined for trunk group B 840 or trunk group E 855, a preferential constraint applies a rule set for selection of a terminating circuit in trunk group B 840 or trunk group E 855 that attempts to avoid use of the interconnections 805 but that allows such use in certain cases. If a call lands on a first media gateway 815, a terminating circuit that is within trunk group B 840 or trunk group E 855, as appropriate, and that is connected to the first media gateway 815 is selected. If all appropriate circuits are unavailable, a terminating circuit that is within trunk group B 840 or trunk group E 855, as appropriate, and that is connected to another media gateway 820, 825, or 830 is selected. If a call lands on a second media gateway 820, a terminating circuit that is within trunk group B 840 or trunk group E 855, as appropriate, and that is connected to the second media gateway 820 is selected. If all appropriate circuits are unavailable, a terminating circuit that is within trunk group B 840 or trunk group E 855, as appropriate, and that is connected to another media gateway 815, 825, or 830 is selected. Analogous routing decisions are made if the call lands on a third media gateway 825 or a fourth media gateway 830.

If the call is destined for trunk group C 845, a restrictive constraint applies a rule set for selection of a terminating circuit in trunk group C 845 that precludes use of an interconnection. Accordingly, if a call lands on a particular media gateway 815, 820, 825, or 830 the call is terminated on a terminating circuit that is within trunk group C 845 and that is associated with the particular media gateway 815, 820, 825, or 830 on which the call landed. If the call is destined for trunk group D 850, no interconnection constraint applies, and the call can be terminated on any media gateway 815, 820, 825, or 830 using the interconnection 805, as necessary.

Figure 9:
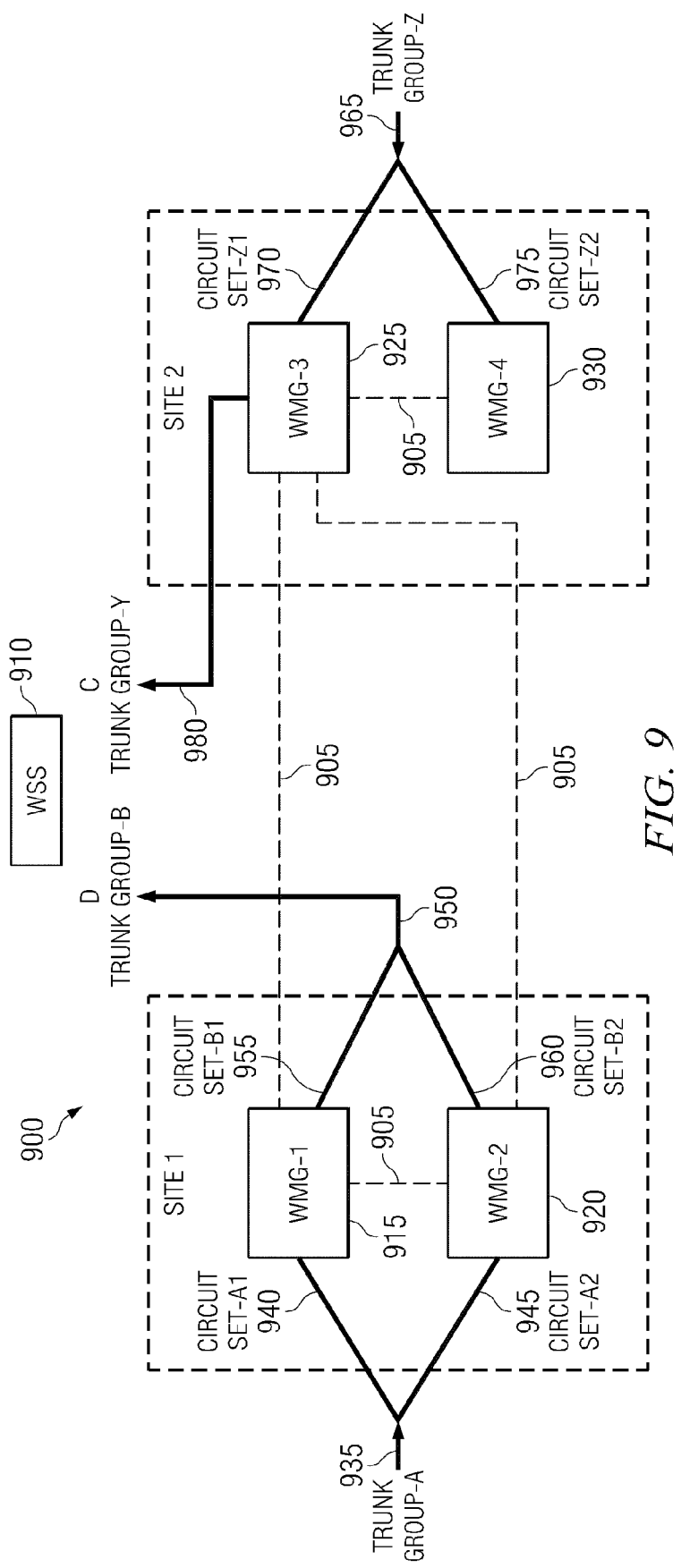
FIG. 9 is a schematic diagram of a scenario in which a distributed MSC includes multiple media gateway clusters that are in different geographical locations and that include interconnections between media gateways within a site and between sites.

FIG. 9 is a schematic diagram of a scenario in which a distributed MSC 900 includes multiple media gateway clusters that are in different geographical locations and that include interconnections 905 between media gateways within a site and between sites. The distributed MSC 900 includes an MSC server 910 and media gateways 915, 920, 925, and 930. An originating trunk group A 935 includes a first set of circuits A1 940 connected to a first media gateway 915 and a second set of circuits A2 945 connected to a second media gateway 920. A terminating trunk group B 950 includes a first set of circuits B1 955 connected to the first media gateway 915 and a second set of circuits B2 960 connected to the second media gateway 920. An originating trunk group Z 965 includes a first set of circuits Z1 970 connected to a third media gateway 925 and a second set of circuits Z2 975 connected to a fourth media gateway 930. A terminating trunk group C 980 includes circuits connected to the third media gateway 925. There are a limited number of interconnections 905 between the media gateways 915, 920, 925, and 930.

In this scenario, the MSC server 910 implements a preferential interconnection constraint for calls in which the destination trunk group is trunk group B 950 and no interconnection constraints for calls in which the destination trunk group is trunk group C 980. The preferential interconnection constraint, for example, attempts to avoid, but selectively allows, an assignment of a terminating circuit from the second set of circuits B2 960 to a call that arrives at the first media gateway 915 using an originating circuit from the first set of circuits A1 940. The preferential constraint applies a rule set for selection of a terminating circuit in trunk group B 950 that attempts to avoid use of the interconnections 905 but that allows such use in certain cases.

If a call destined for trunk group B 950 lands on the first media gateway 915, a terminating circuit in the first set of circuits B1 955 is selected, and the call is routed through an originating circuit in the first set of circuits A1 940, the first media gateway 915, and a terminating circuit in the first set of circuits B1 955. If all circuits in the first set of circuits B1 955 are unavailable, a terminating circuit in the second set of circuits B2 960 is selected, and the call is routed through an originating circuit in the first set of circuits A1 940, the first media gateway 915, one of the interconnections 905, and a terminating circuit in the second set of circuits B2 960. If a call lands on the second media gateway 920, a terminating circuit in the second set of circuits B2 960 is selected, and the call is routed through an originating circuit in the second set of circuits A2 945, the second media gateway 920, and a terminating circuit in the second set of circuits B2 960. If all circuits in the second set of circuits B2 960 are unavailable, a terminating circuit in the first set of circuits B1 955 is selected, and the call is routed through an originating circuit in the second set of circuits A2 945, the second media gateway 920, one of the interconnections 905, and a terminating circuit in the first set of circuits B1 955. Corresponding preferential interconnection constraints to those associated with trunk group B 950 can be associated with trunk group A 935 (e.g., for calls destined for trunk group A 935 that arrive on trunk group B 950).

If the call is destined for trunk group C 980, no interconnection constraint applies, and the call can be routed using interconnections 905 and terminated on any media gateway to reach trunk group C 980. Interconnection constraints with trunk group B 950, trunk group C 980, and/or trunk group Z 965 as the originating trunk groups can also be implemented.

In some cases, a media gateway within a cluster or between different sites can be assigned based on data associated with a call (e.g., the calling party's number, the called party's number, whether the call originates in another provider's network, or the identity of the calling party's and/or called party's provider). Routing rules (e.g., restrictive, preferential, or no interconnection constraints) can also be dependent upon such call data regardless of which media gateway and/or which trunk group receives the call. As illustrated through the foregoing discussion and in the figures, different interconnection constraints can be applied to different media gateways within a distributed MSC. In some implementations, some media gateway clusters may have interconnection facilities while others do not. In addition, interconnection constraints can be applied on a per-trunk group basis (e.g., to routes within a route list).

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. Accordingly, other implementations are within the scope of the following claims.

What is claimed is:

1. A method for routing calls in a distributed mobile switching center environment, the distributed mobile switching center including at least a plurality of Media Gateways and a Mobile Switching Center Server, the method comprising:
receiving a call at a first node in a telecommunication network, wherein the first node includes a plurality of Media Gateways, the first node associated with a plurality of trunks;
identifying an interconnection constraint comprising at least one of a preference and a restriction relating to selection of a circuit among a plurality of circuits associated with one of the plurality of trunks associated with the first node for routing the call; and
routing the call to a trunk in accordance with the interconnection constraint, wherein the plurality of Media Gateways further comprises a cluster comprising a single switch that uses a single set of routing translations,
wherein the first node comprises one of a plurality of IO nodes operable to handle bearer traffic, each of the plurality of IO nodes operating under control of a server implementing signaling traffic associated with the bearer traffic;
wherein the constraint relates to one of a preference or a restriction against routing the call through an interconnection with another of the plurality of nodes; and
wherein the preference comprises:
selecting a circuit associated with the first node for routing the call if a circuit associated with the first node is available; and
allowing use of a circuit associated with a particular other one of the plurality of nodes through an interconnection with the particular one of the plurality of nodes if a circuit associated with the first node is not available.

2. The method of claim 1 wherein the constraint is defined in a set of routing rules based on data relating to the call.

3. The method of claim 1 wherein the server controls routing of the call to a trunk.

4. The method of claim 1 wherein the restriction comprises precluding selection of a circuit associated with one of the plurality of nodes other than the first node.

5. The method of claim 1 wherein each of the plurality of trunks is associated with a plurality of circuits, and each node is associated with at least one circuit for each trunk.

6. The method of claim 1 wherein at least two of the nodes serve an overlapping geographical area.

7. The method of claim 1 wherein at least two of the nodes serve different geographical areas.

8. A telecommunications system comprising: a distributed mobile switching center, the distributed mobile switching center including at least a plurality of Media Gateways and a server, including:
a plurality of media gateways, each media gateway associated with a plurality of trunks;
a number translator in which a received call is translated; and
a server operable to control routing for the plurality of media gateways based on an interconnection constraint associated with each media gateway, the interconnection constraint comprising at least one of a preference and a restriction relating to selecting a circuit among a plurality of circuits associated with a terminating trunk for a call based on at least the media gateway receiving the call, wherein the plurality of Media Gateways further comprises a cluster comprising a single switch that uses a single set of routing translations,
wherein the plurality of media gateways comprise a cluster of media gateways having interconnections between media gateways in the cluster and the constraint providing at least one of a preference or a restriction against routing the call through the interconnection,
wherein the restriction comprises precluding selecting a circuit associated with one of the plurality of media gateways other than the media gateway receiving the call and the preference comprises:
selecting a circuit associated with the media gateway receiving the call if a circuit associated with the media gateway receiving the call is available; and
allowing use of a circuit associated with a particular other one of the plurality of media gateways through an interconnection with the particular media gateway if a circuit associated with the media gateway receiving the call is not available.

9. The telecommunications system of claim 8 wherein each of the plurality of trunks is associated with a plurality of circuits and each media gateway in the cluster is associated with at least one of the circuits for each of the plurality of trunks.

10. The telecommunications system of claim 9 wherein the call is associated with a particular circuit associated with an originating trunk and the media gateway receiving the call is associated with the particular circuit.

11. The telecommunications system of claim 8 wherein the server handles signaling traffic for the distributed mobile switching center and the plurality of media gateways handle bearer traffic for the distributed mobile switching center.

12. A non-transitory machine-readable storage device comprising a medium for storing instructions for causing a data processing apparatus to:
receive data indicating receipt of a call at a first node of a plurality of nodes, wherein each node comprises a Media Gateway, in a telecommunication network, telecommunication network including at least a plurality of Media Gateways and a Mobile Switching Center Server, the first node associated with a plurality of trunks, the call received on an originating trunk of the plurality of trunks, and the plurality of nodes providing switching operations under the control of a call server;
identify an interconnection constraint comprising at least one of a preference and a restriction relating to selecting a circuit among a plurality of circuits associated with one of the plurality of trunks associated with the first node for routing the call; and
control routing of the call to a trunk in accordance with the interconnection constraint, wherein in selected situations the plurality of Media Gateways further comprises a cluster comprising a single switch that uses a single set of routing translations,
wherein the plurality of media gateways comprise a cluster of media gateways having interconnections between media gateways in the cluster and the constraint providing at least one of a preference or a restriction against routing the call through the interconnection,
wherein the restriction comprises precluding selecting a circuit associated with one of the plurality of media gateways other than the media gateway receiving the call and the preference causes the data processing apparatus to:
select a circuit associated with the media gateway receiving the call if a circuit associated with the media gateway receiving the call is available; and
allow use of a circuit associated with a particular other one of the plurality of media gateways through an interconnection with the particular media gateway if a circuit associated with the media gateway receiving the call is not available.

13. The machine-readable storage device of claim 12 wherein the constraint comprises a limitation on routing the call through an interconnection with another of the plurality of nodes.

14. The machine-readable storage device of claim 12 wherein the constraint is included in a set of routing rules assigned to the call and the constraint is associated with the first node.

15. The machine-readable storage device of claim 12 wherein each of the plurality of trunks is associated with a plurality of circuits, and each node is associated with at least one circuit for each trunk.

* * * * *